United States Patent
Fadeev et al.

(10) Patent No.: US 10,693,980 B2
(45) Date of Patent: Jun. 23, 2020

(54) DETERMINING A DURATION CONTENT IS VISIBLE TO A USER OF AN ONLINE SYSTEM

(71) Applicant: Facebook, Inc., Menlo Park, CA (US)

(72) Inventors: Aleksey Sergeyevich Fadeev, Seattle, WA (US); Luxi Guo, Bellevue, WA (US); Laszlo Juracz, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 305 days.

(21) Appl. No.: 15/214,226

(22) Filed: Jul. 19, 2016

(65) Prior Publication Data
US 2018/0027083 A1 Jan. 25, 2018

(51) Int. Cl.
*G06F 15/16* (2006.01)
*H04L 29/08* (2006.01)
*G06F 40/14* (2020.01)
*G06F 40/197* (2020.01)

(52) U.S. Cl.
CPC .............. *H04L 67/22* (2013.01); *G06F 40/14* (2020.01); *G06F 40/197* (2020.01); *H04L 67/02* (2013.01); *H04L 67/20* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,260,774 B2* | 8/2007 | Lambert | ............... | G06Q 30/02 715/234 |
| 7,930,391 B1* | 4/2011 | Holt | ................. | G06Q 30/0255 705/14.53 |
| 8,719,698 B2* | 5/2014 | Blumenau | ............... | G06F 11/34 715/234 |
| 8,832,093 B2* | 9/2014 | Redstone | ................ | H04L 67/18 707/724 |
| 2008/0055613 A1* | 3/2008 | Hatfield | ............... | G06F 16/957 358/1.2 |
| 2014/0068436 A1* | 3/2014 | Steiner | ................... | H04L 65/80 715/719 |
| 2015/0195156 A1* | 7/2015 | Agrawal | ............... | G06F 16/972 709/224 |
| 2015/0310484 A1* | 10/2015 | Haile | ................. | G06Q 30/0246 705/14.45 |
| 2016/0173540 A1* | 6/2016 | Linden | ................ | H04L 65/1083 705/26.8 |
| 2018/0218389 A1* | 8/2018 | Walker | ............... | G06Q 30/0277 |

* cited by examiner

*Primary Examiner* — Mohamed Ibrahim

(57) ABSTRACT

A page of content includes instructions that, when executed by a client device presenting the page, obtain a visibility state of the page describing presentation of the page of content to a user and a time when the visibility state was obtained. Execution of the instructions also generates an identifier with which the visibility state and the time are associated. The instructions also obtained updated visibility states, obtains times when the updated visibility states are obtained, and associates the updated visibility states and their corresponding times with the identifier. The client device communicates the obtained visibility state, updated visibility states, and corresponding times to an online system in association with the identifier. Based on the times corresponding to the visibility state and the updated visibility states, the online system determines a duration the page was presented.

19 Claims, 3 Drawing Sheets

DETERMINING A DURATION CONTENT IS VISIBLE TO A USER OF AN ONLINE SYSTEM

BACKGROUND

This disclosure relates generally to presenting content to users of an online system, and more specifically to determining a duration that the content was presented to the users of the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Third party systems and online systems also provide content to users. For example, a third party system provides pages of content to users. Similarly, an online system provides pages of content to users. To increase exposure to and interaction with pages of content provided by third party systems or by the online system, the online system may provide its users with content items identifying pages of content. If a user accesses a content item identifying a page of content via a client device, the client device may retrieve and present the page of content to the user.

When providing content items for presentation to the online system identifying pages of content provided by a third party system, the third party system has an interest in the effectiveness of the content items in causing online system users to view or to access the pages of content. Similarly, the online system may seek to analyze effectiveness of content items provided by the online system in causing users to interact with pages of content provided by the online system. Conventionally, tracking mechanisms may be included in pages of content that are executed when the page of content is loaded by a client device and communicate an indication that the page of content was loaded to a third party system or to an online system associated with the page of content. However, these conventional tracking mechanisms provided limited information about interaction with the page of content as they simply identify that the page of content has been loaded by a client device. This limited information about interaction with the page of content provides limited information for an online system or a third party system to evaluate effectiveness of content items identifying the page of content in inciting users to engage with the page of content.

SUMMARY

Various third party systems provide content to users of the online system. For example, a third party system maintains pages of content that users may access through one or more applications executing on a client device. To increase exposure of content maintained by a third party system, the third party system may provide content items to an online system that selects content items for presentation to its users. Content items provided by the third party system to the online system identify content provided by the third party system and include instructions or information for accessing the content by interacting with the content items. For example, the third party system provides the online system with a content item identifying a web page maintained by the third party system and including a network address for accessing the web page when a user selects or interacts with the content item. If the online system presents a content item identifying a page of content provided by the third party system to a user who subsequently accesses the content item via a client device, the client device obtains the page of content from the network address specified in the content item, allowing the user to easily access the page of content and increasing awareness of the page of content.

When providing content items to the online system identifying pages of content provided by a third party system, the third party system has an interest in the effectiveness of the content items in causing online system users to view or to access the pages of content. For example, if the third party system provides compensation to the online system in exchange for presenting a content item, the amount of time users presented with the content item by the online system view or are presented with a page of content identified by the content item allows the third party system to evaluate a return on the amount of compensation provided to the online system. Similarly, the online system may seek to analyze effectiveness of content items provided by the online system in causing users to interact with pages of content provided by the online system. To more accurately determine a duration an online system user is presented with a page of content identified by a content item presented by the online system, the third party system includes a tracking mechanism in the page of content. The tracking mechanism comprises instructions that, when executed by a client device presenting the page of content, obtain information describing visibility of the page of content to a user via the client device.

In various embodiments, the tracking mechanism comprises instructions that, when executed by a client device presenting the page of content, obtain a visibility state of an application executing on the client device. The visibility state indicates whether the application is presenting at least a threshold amount of the page of content. For example, the application maintains various visibility states for the page of content that indicate whether the page of content is presented by the application, the page of content is hidden by the application, or whether the page of content has been closed by the application. When executed, the instructions cause the client device to obtain an updated visibility state at periodic intervals, when the visibility state changes, when the client device receives a request for the updated visibility state from the online system, or when any other suitable conditions are satisfied. Additionally, when executed by the client device, the instructions included in the page of content obtain a time when the visibility state of the application and obtain times when updated visibility states of the application are obtained. Execution of the instructions included in the page of content also generates an identifier corresponding to execution of the instructions by the client device when the instructions and associates the visibility state, the updated visibility states, and times when the visibility state and when the updated visibility states were obtained with the generated identifier.

The client device presenting the page of content including the tracking mechanism transmits the visibility state and the time the visibility state was obtained as well as the updated visibility states and the times each of the updated visibility states were obtained to the online system in association with the generated identifier. Based on the times associated with the visibility state and with the updated visibility states, the online system determines a duration the page of content was presented for the generated identifier. For example, based on times associated with visibility states indicating the page of content is presented by the client device that are associated with the generated identifier, the online system determines the duration the page of content was presented associated with the generated identifier. In various embodiments, the online system accounts for amounts of time when the visibility state indicates the page of content was hidden by the application to more accurately determine the duration the page of content was visible when presented in response to selection of the content item identifying the page of content.

For example, the online system identifies an earliest time associated with the selected identifier when the application executing on the client device presented the page of content and a time associated with the selected identifier when the application executing on the client device presented the page of content. For an interval between the identified earliest time and the time, the online system identifies amounts of time between times when the application executing on the client device presented the page of content and times when the application executing on the client device hid the page of content. The online system may combine the identified amounts of time to determine the duration the page of content was visible to the user that is associated with the selected identifier. In some embodiments, the online system may determine durations the page of content was visible associated with various identifiers and determine an average duration the page of content item was visible based on the determined durations.

Accounting for times when the page of content is hidden by the client device presenting the page of content as well as times when the client device presents the page of content allows the online system to more accurately determine lengths of time users are presented with the page of content. This increased accuracy allows the online system to subsequently select content items identifying pages of content with which the user, or other users, are likely to view or with which the user, or other users, are likely to interact. For example, the online system may modify subsequent selection of a content item identifying the page of content to other online system users based on durations that the page of content item was presented when accessed via content items presented by the online system.

BRIEF DESCRIPTION OF THE DRAWINGS

FIG. 2 is a block diagram of an online system, in accordance with an embodiment of.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
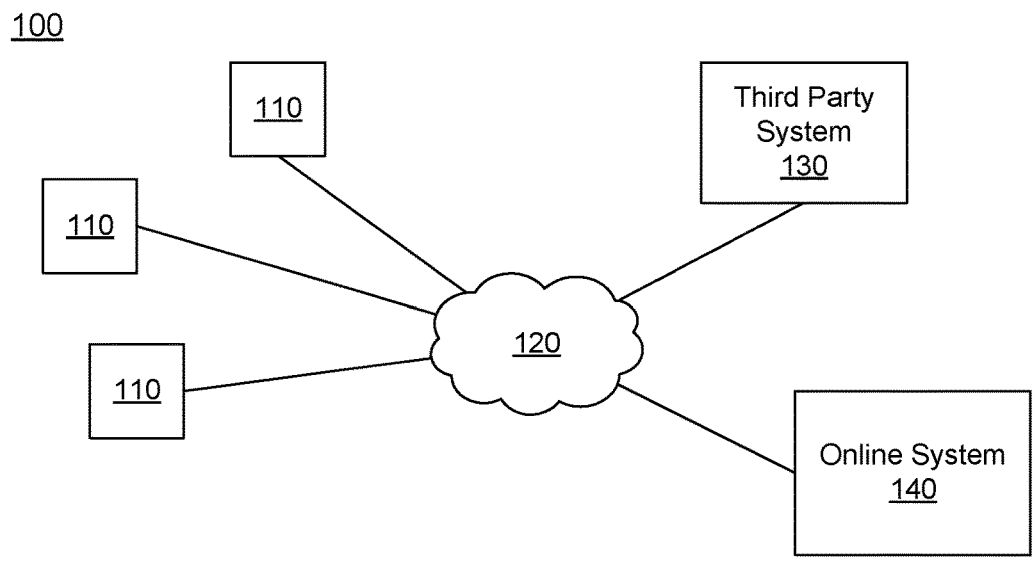
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3 G, 4 G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content. If the online system 140 presents the content item to a user who subsequently accesses the content item via a client device 110, the client device 110 obtains the page of content from the network address specified in the content item. This allows the user to more easily access the page of content.

When providing content items to the online system 140 identifying pages of content provided by a third party system 130, the third party system 130 has an interest in the effectiveness of the content items in causing online system users to view or to access the pages of content. For example, if the third party system 130 provides compensation to the online system 140 in exchange for presenting a content item, the amount of time users presented with the content item by the online system 140 view or are presented with a page of content identified by the content item allows the third party system 130 to evaluate a return on the amount of compensation provided to the online system 140. To more accurately determine a duration an online system user is presented with a page of content identified by a content item presented by the online system 140, the third party system 130 includes a tracking mechanism in the page of content. The tracking mechanism comprises instructions that, when executed by a client device 110 presenting the page of content, obtain information describing visibility of the page of content to a user via the client device 110.

As further described below in conjunction with FIG. 3, the instructions comprising the tracking mechanism obtain a visibility state of an application executing on a client device 110 presenting the page of content when the instructions are executed by the client device 110. The visibility state indicates whether the application is presenting at least a threshold amount of the page of content. An application may maintain various visibility states for the page of content that indicate whether the page of content is presented by the application, the page of content is hidden by the application, or whether the page of content has been closed by the application. When executed, the instructions cause the client device 110 to obtain an updated visibility state at periodic intervals, when the visibility state changes, when the client device 110 receives a request for the updated visibility state from the online system 140, or when any other suitable conditions are satisfied. Additionally, when executed by the client device 110, the instructions included in the page of content obtain a time when the visibility state of the application and obtain times when updated visibility states of the application are obtained. The instructions also generate an identifier corresponding to execution of the instructions by the client device 110 when the instructions are executed by the client device 110 and associate the visibility state, the updated visibility states, and times when the visibility state and when the updated visibility states were obtained with the generated identifier.

The client device 110 presenting the page of content including the tracking mechanism transmits the visibility state and the time the visibility state was obtained as well as the updated visibility states and the times each of the updated visibility states were obtained to the online system 140 in association with the generated identifier. Based on the times associated with the visibility state and with the updated visibility states, the online system 140 determines a duration the page of content was presented for the generated identifier. For example, based on times associated with visibility states indicating the page of content is presented by the client device 110 that are associated with the generated identifier, the online system 140 determines the duration the page of content was presented associated with the generated identifier. In various embodiments, the online system 140 accounts for amounts of time when the visibility state indicates the page of content was hidden by the application to more accurately determine the duration the page of content was visible when presented in response to selection of the content item identifying the page of content.

Figure 2:
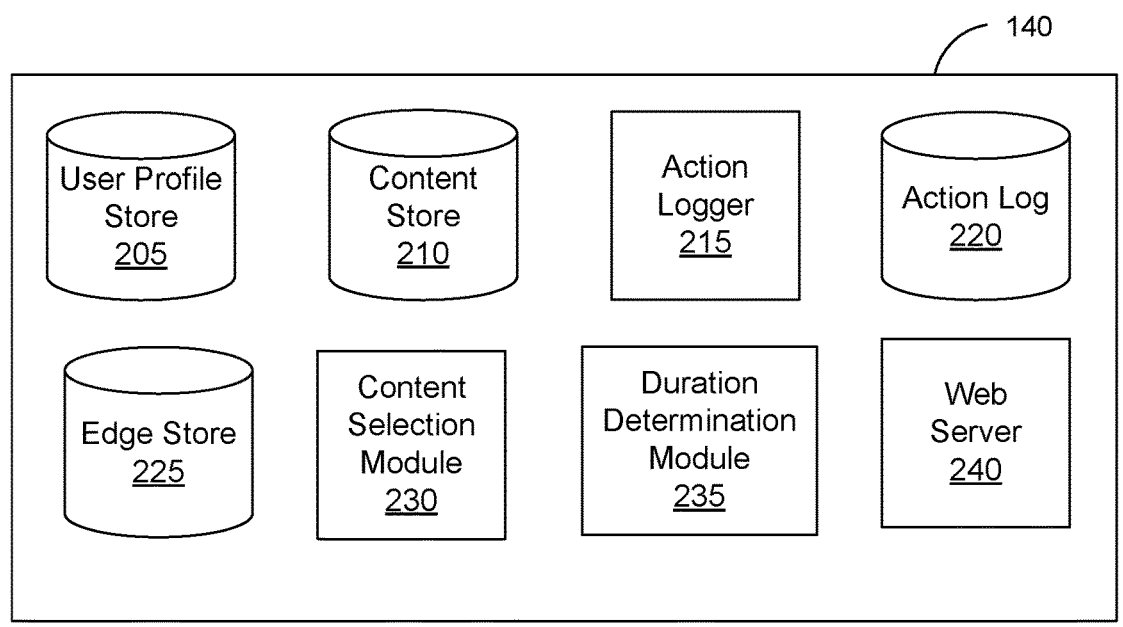

FIG. 2 is a block diagram of an architecture of the online system 140. The online system 140 shown in FIG. 2 includes a user profile store 205, a content store 210, an action logger 215, an action log 220, an edge store 225, a content selection module 230, a duration determination module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The duration determination module 235 receives information describing visibility of a page of content from a client device 110 presenting the page of content to a user of the online system 140. As further described below in conjunction with FIG. 3, the received information identifies times when an application executing on the client device 110 is presenting the page of content, when the application executing on the client device 110 hides the page of content, and times when the application execution on the client device 110 closes the page of content. Additionally, the received information associates an identifier, generated when the client device 110 executing the application executes the tracking mechanism, further described above in conjunction with FIG. 1 and below in conjunction with FIG. 3, included in the page of content, with the information describing visibility of the page of content.

Based on the information describing visibility of the page of content, the duration determination module 235 determines a duration that the page of content was visible to a user via the application executing on the client device 110. The duration determination module 235 selects an identifier and obtains times when an application executing on the client device 110 is presenting the page of content, times when the application executing on the client device 110 hides the page of content, and times when the application execution on the client device 110 closes the page of content associated with the selected identifiers. In some embodiments, the duration determination module 235 identifies an earliest time associated with the selected identifier when the application executing on the client device 110 presented the page of content and a time associated with the selected identifier when the application executing on the client device 110 presented the page of content. For an interval between the identified earliest time and the time, the duration determination module 235 identifies amounts of time between times when the application executing on the client device 110 presented the page of content and times when the application executing on the client device 110 hid the page of content. As further described below in conjunction with FIG. 3, the duration determination module 235 combines the identified amounts of time to determine the duration the page of content was visible to the user that is associated with the selected identifier. The duration determination module 235 may determine durations the page of content was visible associated with various identifiers and determine an average duration the page of content item was visible based on the determined durations, as further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Determining a Duration a Content Item is Visible to a User of an Online System

Figure 3:
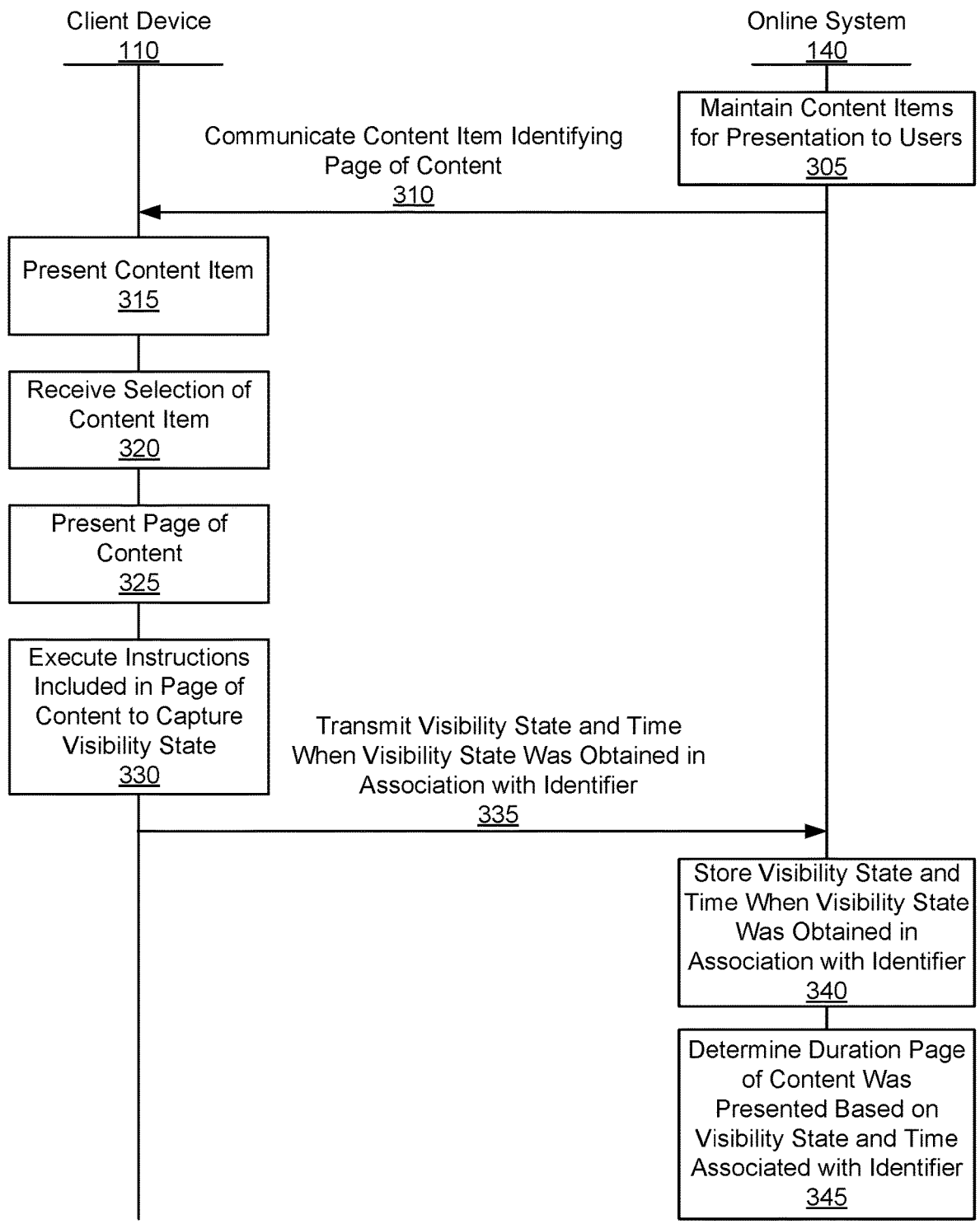
FIG. 3 is an interaction diagram of a method determining a duration a page of content identified by a content item presented by an online system is visible to an online system user, in accordance with an embodiment.

FIG. 3 is an interaction diagram of one embodiment of a method for determining an amount of time page of content associated with a content item presented by an online system 140 is visible to a user of the online system 140. In other embodiments, the method may include different and/or additional steps than those shown in FIG. 3. Additionally, steps of the method may be performed in different orders than the order described in conjunction with FIG. 3 in various embodiments.

An online system 140 maintains 305 various content items for presentation to users of the online system 140. Content items may be generated by the online system 140, generated by users of the online system 140, or received from one or more third party system 130. The online system 140 may receive compensation from a third party system 130 in exchange for presenting certain content items to users or in exchange for users performing one or more specific actions after being presented with certain content items. As further described above in conjunction with FIG. 2, the online system 140 selects one or more content items for presentation to a user by applying one or more selection processes to at least a set of the content items maintained 305 by the online system 140. One or more content items selected by the one or more selection processes are communicated from the online system 140 to a client device 110 associated with the user for presentation to the user.

One or more of the content items maintained 305 by the online system 140 identify a page of content that is presented to a user when the user accesses a content item. For example, when a user selects a content item presented by a client device 110, the client device 110 obtains and presents the page of content identified by the content item to the user. In various embodiments, the page of content is provided by the online system 140 or is provided by a third party system 130. The page of content identified by a content item includes a tracking mechanism that comprises instructions that, when executed by a client device 110 presenting the page of content, obtain information describing visibility of the page of content to the user via the client device 110. In various embodiments, the tracking mechanism includes instructions, than when executed by the client device 110, obtain a visibility state of an application executing on the client device 110 presenting the page of content, where the visibility state indicates whether the application is presenting at least a threshold amount of the page of content. An application may maintain various visibility states for the page of content that indicate whether the page of content is presented by the application, the page of content is hidden by the application, or whether the page of content has been closed by the application. When executed by the client device 110, the instructions included in the page of content obtain a visibility state for the page of content maintained by the application. In some embodiments, the instructions are executed by the client device 110 when the client device 110 initially loads the page of content, causing the visibility state to indicate presentation of the page of content when the page of content is initially loaded by the client device 110. For example, if the application is presenting the page of content when the instructions included in the content item are executed, the instructions obtain a visibility state indicating the page of content is presented by the application. As another example, if the application has hidden the page of content from presentation to the user when the instructions included in the content item are executed, the instructions obtain a visibility state indicating the page of content is hidden by the application. In various embodiments, the instructions obtain the visibility state by communicating an application programming interface call to the application presenting the page of content, which retrieves the visibility state in response to the application programming interface call.

When executing the instructions, the client device 110 may obtains the visibility state of the application in response to the user performing one or more actions that are identified by the application or by the client device 110. The instructions included in the page of content specify the actions that, when identified by the application or by the client device 110, cause the visibility state of the application to be obtained. Hence, the online system 140, or a third party system 130 associated with the page of content, may specify actions for which the visibility state of the application is obtained in the instructions, and the visibility state of the application is obtained when the client device 110 is executing the instructions and the client device identifies at least one or the specified actions.

In some embodiments, the instructions included in the content item, when executed by the client device 110, obtain an updated visibility state when the application presenting the content item modifies the visibility state. For example, the application modifies the visibility when the application hides the page of content that was presented by the application, when the application presents the page of content that was previously hidden by the application, or when the application closes the page of content that was previously presented by the application (or hidden by the application). When executed by the client device 110, the instructions included in the page of content obtain the updated visibility state when the application modifies the visibility state, allowing changes in the visibility state to be captured. Alternatively, when executed by the client device 110, the instructions in the content item obtain the updated visibility state from the application at a periodic time interval, rather than when the visibility state is modified by the application.

In other embodiments, when executed by the client device 110, the instructions obtain the visibility state of the application in response to the client device 110 receiving a request for the visibility state from the online system 140. Similarly, the instructions may obtain the visibility state of the application in response to the client device 110 receiving a request for the updated visibility state from the online system 140. For example, the online system 140 periodically communicates a request for the visibility state to the client device 110. When the client device 110 is executing the instructions included in the content item, the instructions obtain the updated visibility state of the application in response to the client device 110 receiving the request from the online system 140.

Additionally, the instructions included in the page of content obtain a time when the visibility state of the application was obtained when the instructions are executed by the client device 110. The instructions obtain a time from the client device 110 when the visibility state was obtained and associates the obtained time with the visibility state. For example, the client device 110 obtains a time of day from a clock or other timing system included in the client device 110 when the instructions obtain the visibility state and associates the obtained time of day with the visibility state. If one or more modified visibility states are obtained when the instructions are executed by the client device 110, a time is obtained from the client device 110 when each of the modified visibility states are obtained and associated with the corresponding modified visibility state.

The instructions also generate an identifier corresponding to execution of the instructions by the client device 110 when the instructions are executed by the client device 110. Generating the identifier subsequently allows identification of execution of instructions by different client devices 110 presenting page of content including the instructions or allows identification of execution of instructions included in pages of content presented by the client device 110. The obtained visibility state and time obtained from the client device 110 when the visibility state was obtained are associated with the generated identified by the instructions, when the instructions are executed. If the instructions obtain modified visibility states as described above, the modified visibility states and times obtained from the client device 110 corresponding to various modified visibility states are also associated with the generated identifier. The generated identifier includes information capable of identifying the page of content to the online system 140.

The online system 140 selects a content item identifying a page of content including the instructions for presentation to a user, as further described above in conjunction with FIG. 2, and communicates 310 the content item to a client device 110 associated with the user. The client device 110 subsequently presents 315 the content item identifying the page of content including the instructions to the user via a display device or via another suitable interface. In response to receiving 320 a selection of the content item identifying the page of content including the instructions, the client device 110 presents 325 the page of content including the instructions received from the online system 140 via an application executing on the client device 110. For example, if the page of content is a web page, if the client device 110 receives 320 a selection of the content item identifying the web page (e.g., receives a specific input with a region of a display device presenting the content item, receives a gesture via an input device that contacts at least a portion of the region of the display device presenting the content item), the client device 110 obtains the web page and presents 325 the web page via an application executing on the client device 110. In various embodiments, the client device 110 presents the content item identifying the page of content from the online system 140 via an application and executes an additional application to present 325 the page of content in response to receiving a selection of the content item.

In response to presenting 325 the page of content, the client device 110 executes 330 the instructions included in the content item. Hence, in response to the application executing on the client device 110 presenting the presenting 325 the page of content including the instructions, the client device 110 executes 330 the instructions and obtains the visibility state of the application executing on the client device 110 presenting 325 the page of content, obtains the time when the visibility state was obtained, and generates the identifier corresponding to execution of the instructions included page of content by the client device 110. As further described above, executing 330 the instructions causes the client device 110 to associate the obtained visibility state and time when the visibility state was obtained with the generated identifier; in embodiments where updated visibility states are obtained while the instructions are executed, the client device 110 also associates updated visibility states and times corresponding to when the updated visibility states were obtained with the generated identifier.

The client device 110 transmits 335 the visibility state and time when the visibility state was obtained in association with the generated identifier to the online system 140, which stores 340 the visibility state and time when the visibility state was obtained in association with the generated identifier. Similarly, updated visibility states obtained by execution of the instructions included in the page of content and times corresponding to the updated visibility states are associated with the generated identifier and transmitted 335 from the client device 110 to the online system 140, which stores 340 the updated visibility states and times when various updated visibility states were obtained in association with the generated identifier. Based on times when the visibility state and when updated visibility states are obtained, the online system 140 determines 345 a duration the page of content was visible to the user via the application executing on the client device 110.

The online system 140 may determine 345 the duration the page of content was visible to the user via the client device 110 in various ways. In some embodiments, the online system 140 identifies a visibility state associated with the generated identifier indicating the page of content is presented by the application executing on the client device 110 and a time when the visibility state indicating the page of content is presented by the application was obtained. The online system 140 also identifies a visibility state associated with the generated identifier indicating the page of content has been closed by the application executing on the client device 110 and a time when the visibility state indicating the page of content was closed by the application was obtained. By determining a difference between the time when the visibility state indicating the page of content was closed by the application was obtained and the time when the visibility state indicating the page of content is presented by the application was obtained, the online system 140 determines 345 a duration the page of content was visible to the user via the application executing on the client device 110 associated with the generated identifier.

As another example, if the received information includes a visibility state or an updated visibility state indicating the application executing on the client device 110 hid the page of content, the online system 140 accounts for an amount of time the page of content was hidden by the application when determining 345 the duration the page of content was visible to the user. In one embodiment, the online system 140 identifies a time when a visibility state or an updated visibility state associated with the generated identifier indicates the page of content is presented by the application was obtained and identifies additional times when updated visibility states associated with the generated identifier indicates the page of content is hidden by the application. Additionally, the online system 140 identifies an ending time when an updated visibility state associated with the generated identifier indicates the page of content has been closed by the application. For an interval between an earliest time when the visibility state or an updated visibility state associated with the generated identifier indicates the page of content is presented by the application and the ending time, the online system 140 determines a difference between a time when an updated visibility state associated with the generated identifier indicates the page of content is hidden by the application was obtained and an earlier time when a consecutive updated visibility state associated with the generated identifier indicates the page of content is presented by the application. For each updated visibility state associated with the generated identifier indicating the page of content hidden by the application, the online system 140 determines the difference between the time when the updated visibility state associated with the generated identifier indicating the page of content is hidden by the application was obtained and an earlier time when an earlier consecutive updated visibility state associated with the generated identifier indicating the page of content is presented by the application. The online system 140 combines the determined differences within the interval to determine 345 the duration the page of content was visible to the user via the application executing on the client device 110.

Determining 345 the duration the page of content was visible when presented by the application executing on the client device 110 based on the visibility state and updated visibility states received from the client device 110 allows the online system 140 to more accurately determine how long the page of content is viewed. The online system 140 may average durations the page of content was visible determined 345 based on visibility states and times when visibility states were obtained associated with various generated identifiers to determine an average duration the page of content is visible when it is presented in response to selection of the content item. This may allow the online system 140 to identify how effective the content item selected by the online system 140 is in having users view the page of content identified by the content item for at least a threshold duration or to account for users who view the page of content identified by the content item for less than a minimum duration when evaluating the effectiveness of the content item. In some embodiments, the online system 140 subsequently modifies selection of the content item based on the average duration the page of content was visible. For example, if the average duration the page of content was visible equals or exceeds a threshold amount of time, the online system 140 may increase one or more characteristics of the content item used by the one or more selection processes to increase a likelihood of the content item being selected for presentation. Conversely, if the average duration the page of content was visible is less than the threshold amount of time, the online system 140 may decrease one or more characteristics of the content item used by the one or more selection processes to decrease the likelihood of the content item being selected for presentation. For example, if the content item includes a bid amount, the online system 140 increases the bid amount if the average duration the page of content was visible equals or exceeds the threshold amount; alternatively or additionally, the online system 140 decreases the bid amount if the average duration the page of content was visible is less than the threshold amount.

Figure 4:
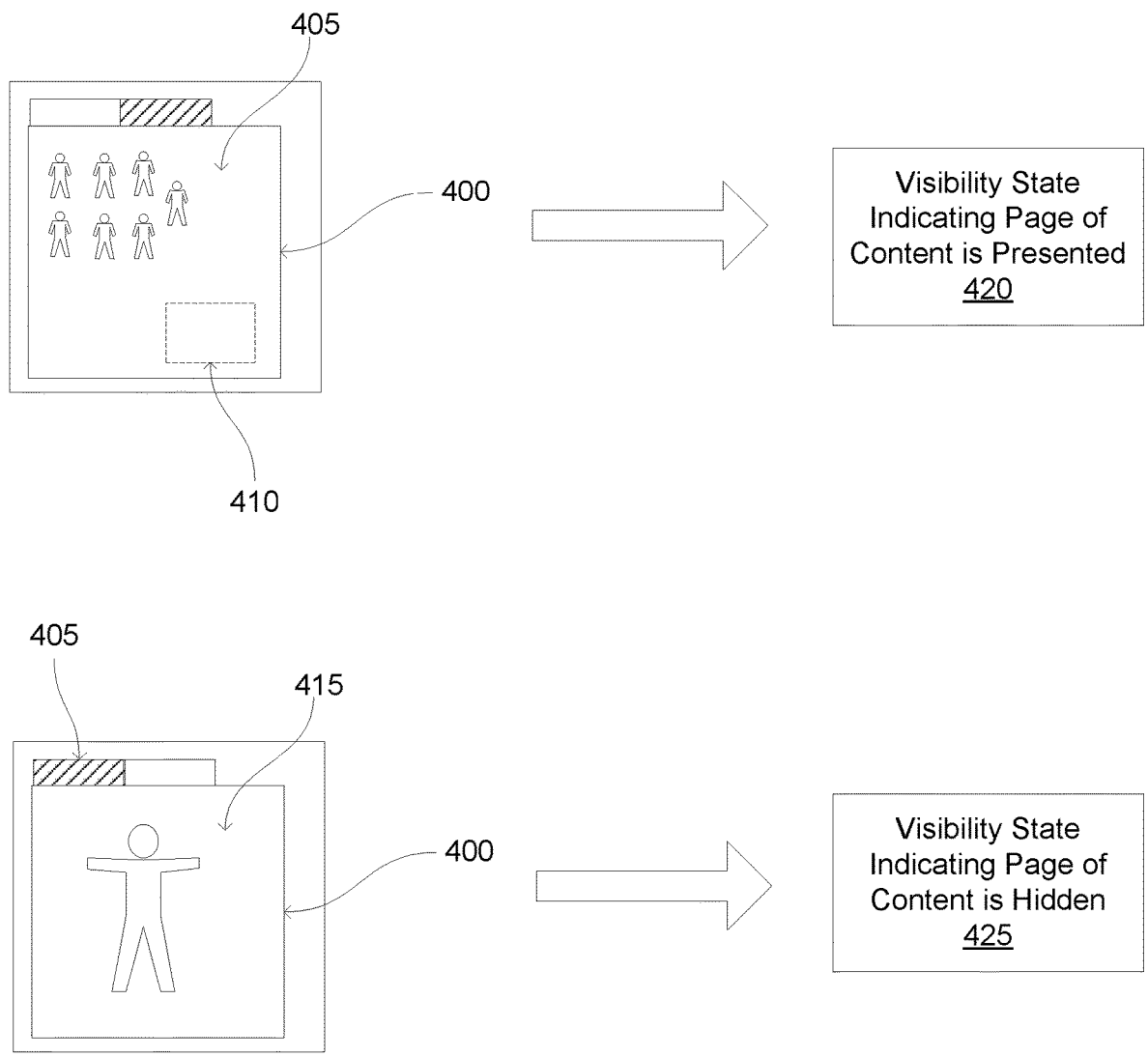
FIG. 4 is example of visibility states obtained by execution of instructions included in a page of content, in accordance with an embodiment.

FIG. 4 shows an example of visibility states obtained by execution of instructions included in a page of content. In the example of FIG. 4, an application 400 executing on a client device 110 presents a page of content 405 including instructions 410 that, when executed by the client device 110, obtain a visibility state of the application 400 presenting the page of content 405, obtain a time when the visibility state was obtained, and associate the visibility state and time when the visibility state was obtained with an identifier, as further described above in conjunction with FIG. 3. When the application 400 is presenting the page of content 405, at least a threshold amount of the page of content 405 is visible (or otherwise perceptible) to a user via the application 400. As the application 400 presents the page of content 405, the instructions 410 are executed by the application 400, or by the client device 110, and the visibility state of the application 400 is obtained. For example, executing the instructions provides an application programming interface call to the application 400 that identifies the page of content 405 and requests the visibility state of the page of content 405. When the application 400 is presenting the page of content 405, the application 400 provides a visibility state 420 indicating the page of content 405 is visible via the application 400.

However, if the application 400 has loaded the page of content 405, but the page of content 405 is hidden by the application 400, less than a threshold amount of the page of content is visible (or otherwise perceptible) via the application. For example, if the application 400 presents an alternative page of content 415 but has the page of content 405 loaded including the instructions 410 loaded, execution of the instructions 410 obtains a visibility state 425 indicating the page of content 405 is hidden. In some embodiments, execution of the instructions 410 by the application 400 or by the client device 110 obtains the visibility state 425 indicating the page of content 405 is hidden in response to the application 400 modifying the presented content to hide the page of content 405; similarly, execution of the instructions 410 by the application 400 or by the client device 110 obtains the visibility state 420 indicating the page of content 405 is hidden in response to the application 400 modifying the presented content so at least a threshold amount of the page of content 405 is visible. As further described above in conjunction with FIG. 3, executing the instructions also obtains a time when the visibility state 420 indicating the page of content 405 is visible was obtained and obtains a time when the visibility state 425 indicating the page of content 405 is hidden. Additionally, if the application 400 closes the page of content 405, another visibility state is obtained by the instructions 410 included in the page of content 405 indicating the page of content 405 is closed and a time when the other visibility state was obtained is also obtained.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a content item from an online system at a client device associated with a user of the online system, the content item including a network address for accessing a web page, the web page including instructions that, when executed by the client device, cause the client device to:
    obtain a visibility state of an application presenting the web page, the visibility state indicating whether at least a threshold amount of the web page is presented on a display device of the client, the visibility state further indicating if the application has closed the web page, the obtaining in response to the client device identifying that an action performed by a user of the client device matches one or more actions that are specified by the instructions included in the page of content,
obtain a time when the visibility state was obtained, and
generate an identifier corresponding to execution of the instructions by the client device;
presenting the content item on the client device;
receiving a selection of the network address in the presented content item at the client device;
presenting the web page identified by the content item in the application executing on the client device in response to receiving the selection of the network address in the presented content item;
executing the instructions included in the web page identified by the content item in response to presenting the web page; and
transmitting the visibility state in association with the time and the identifier from executing the instructions to the online system.

2. The method of claim 1, wherein the web page further includes instructions that, when executed by the client device, cause the client device to:
obtain an updated visibility state of the application presenting the web page;
obtain a time when the updated visibility state was obtained; and
associate the updated visibility state and the time when the updated visibility state was obtained with the generated identifier.

3. The method of claim 2, wherein obtain the updated visibility state of the application presenting the web page comprises:
obtain the updated visibility state in response to the application presenting the web page modifying the visibility state.

4. The method of claim 2, wherein obtain the updated visibility state of the application presenting the web page comprises:
obtain the updated visibility state at a periodic time interval.

5. The method of claim 2, wherein obtain the updated visibility state of the application presenting the web page comprises:
obtain the updated visibility state in response to the client device receiving a request for the updated visibility state from the online system.

6. The method of claim 1, wherein obtain the visibility state of the application presenting the web page, comprises:
communicate an application programming interface call to the application presenting the web page; and
obtain the visibility state from the application presenting the web page in response to the application programming interface call.

7. The method of claim 1, wherein the visibility state indicates one selected from a group consisting of: the application is presenting the web page and the application is hiding the web page.

8. The method of claim 1, wherein obtain the visibility state of the application presenting the web page comprises:
obtain the visibility state in response to the client device receiving a request for the visibility state from the online system.

9. The method of claim 1, wherein obtain the time when the visibility state was obtained comprises:
obtain a time from a timing system included in the client device when the visibility state was obtained.

10. A method comprising:
including instructions in a web page that, when executed by a client device presenting the web page, cause the client device to:
obtain a visibility state of an application presenting the web page, the visibility state indicating whether at least a threshold amount of the web page is presented on a display device of the client device, the visibility state further indicating if the application has closed the web page, the obtaining in response to the client device identifying that an action performed by a user of the client device matches one or more actions that are specified by the instructions included in the page of content,
obtain a time when the visibility state was obtained,
obtain one or more updated visibility states of the application presenting the web page,
obtain one or more times when each of the one or more updated visibility states were obtained, and
generate an identifier corresponding to execution of the instructions by the client device;
receiving the visibility state and the time when the visibility state was obtained in association with the identifier;
receiving the one or more updated visibility states and the one or more times when each of the one or more updated visibility states were obtained in association with the identifier; and
determining a duration the web page was presented based on the visibility state, the time when the visibility state was obtained, the one or more updated visibility states, and the one or more times when each of the updated visibility states were obtained.

11. The method of claim 10, further comprising:
modifying subsequent selection of content items including a network address of the web page for presentation to users based on the determined duration.

12. The method of claim 11, modifying subsequent selection of content items including the network address of the web page for presentation to users based on the determined duration comprises:
increasing a characteristic of a content item including the link to the web page used by one or more selection processes in response to the determined duration equaling or exceeding a threshold amount of time.

13. The method of claim 11, modifying subsequent selection of content items including the network address of the web page for presentation to users based on the determined duration comprises:
decreasing a characteristic of a content item including the network address of the web page used by one or more selection processes in response to the determined duration being less than a threshold amount of time.

14. The method of claim 10, wherein the visibility state indicates the application is presenting the web page and wherein determining the duration the web page was presented comprises:
determining the duration the web page was presented as a difference between a time when an updated visibility state indicates the application closed the web page was obtained and the time when the visibility state was obtained.

15. The method of claim 10, wherein determining the duration the web page was presented comprises:

identifying an earliest time when the visibility state indicates the application is presenting the web page or when an updated visibility state indicates the application is presenting the web page;

identifying a time when the modified visibility state indicates the application has closed the web page;

for an interval between the earliest time and the time, identifying amounts of time between times when a modified visibility state indicating the application hid the web page and earlier times when a consecutive modified visibility state indicating the application presented the web page was obtained or an earlier time when the visibility state was obtained if the visibility state is consecutive with the modified visibility state indicating the application hid the web page and was obtained earlier than the modified visibility state indicating the application hid the web page; and determining the duration the web page was presented as a combination of the identified amounts of time.

16. A computer program product comprising a non-transitory computer readable storage medium having instructions encoded thereon that, when executed by a processor, cause the processor to:

include additional instructions in a web page that, when executed by a client device presenting the web page, cause the client device to:

obtain a visibility state of an application presenting the web page, the visibility state indicating whether at least a threshold amount of the web page is presented on a display device of the client device, the visibility state further indicating if the application has closed the web page, the obtain in response to the client device identifying that an action performed by a user of the client device matches one or more actions that are specified by the instructions included in the page of content, obtain a time when the visibility state was obtained, obtain one or more updated visibility states of the application presenting the web page, obtain one or more times when each of the one or more updated visibility states were obtained, and generate an identifier corresponding to execution of the instructions by the client device;

receive the visibility state and the time when the visibility state was obtained in association with the identifier;

receive the one or more updated visibility states and the one or more times when each of the one or more updated visibility states were obtained in association with the identifier; and determine a duration the web page was presented based on the visibility state, the time when the visibility state was obtained, the one or more updated visibility states, and the one or more times when each of the updated visibility states were obtained.

17. The computer program product of claim 16, wherein the visibility state indicates the application is presenting the web page and wherein determine the duration the web page was presented comprises:

determine the duration the web page was presented as a difference between a time when an updated visibility state indicates the application closed the web page was obtained and the time when the visibility state was obtained.

18. The computer program product of claim 16, wherein determine the duration the web page was presented comprises:

identify an earliest time when the visibility state indicates the application is presenting the web page or when an updated visibility state indicates the application is presenting the web page;

identify a time when the modified visibility state indicates the application has closed the web page;

for an interval between the earliest time and the time, identify amounts of time between times when a modified visibility state indicating the application hid the web page and earlier times when a consecutive modified visibility state indicating the application presented the web page was obtained or an earlier time when the visibility state was obtained if the visibility state is consecutive with the modified visibility state indicating the application hid the webpage and was obtained earlier than the modified visibility state indicating the application hid the web page; and determine the duration the web page was presented as a combination of the identified amounts of time.

19. The computer program product of claim 16, wherein the computer readable storage medium further has instructions encoded thereon that, when executed by the processor cause the processor to:

modify subsequent selection of content items including a network address of the web page for presentation to users based on the determined duration.

* * * * *